US012789248B2

(12) United States Patent
Baumgartner et al.

(10) Patent No.: US 12,789,248 B2
(45) Date of Patent: Nov. 10, 2026

(54) RADIAL PRESS

(71) Applicant: Uniflex-Hydraulik GmbH, Karben (DE)

(72) Inventors: Carsten Baumgartner, Laubach (DE); Martin David, Niddatal (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 179 days.

(21) Appl. No.: 18/921,136

(22) Filed: Oct. 21, 2024

(65) Prior Publication Data

US 2025/0041925 A1 Feb. 6, 2025

Related U.S. Application Data

(63) Continuation of application No. PCT/EP2023/059885, filed on Apr. 17, 2023.

(30) Foreign Application Priority Data

Apr. 19, 2022 (DE) ..................... 20 2022 102 074.4

(51) Int. Cl.
*B21D 28/00* (2006.01)
*B23D 15/02* (2006.01)
*B23D 35/00* (2006.01)

(52) U.S. Cl.
CPC ........... *B21D 28/002* (2013.01); *B23D 15/02* (2013.01); *B23D 35/001* (2013.01)

(58) Field of Classification Search
CPC ...... B23D 15/02; B23D 35/001; B21D 28/00; B21D 28/002
See application file for complete search history.

(56) References Cited

U.S. PATENT DOCUMENTS

| | | | | | |
|---|---|---|---|---|---|
| 860,009 | A | * | 7/1907 | Becker | B21D 28/002 200/16 R |
| 2,298,358 | A | * | 10/1942 | Ernst | B30B 15/16 60/446 |
| 3,455,140 | A | * | 7/1969 | Smith | H01R 43/0585 72/434 |
| 3,568,495 | A | * | 3/1971 | Duffield et al. | B21D 41/00 72/402 |
| 4,276,765 | A | * | 7/1981 | Yoneda | F16L 33/2071 72/402 |
| 4,785,656 | A | * | 11/1988 | Kennedy | H01R 43/058 72/402 |

(Continued)

*Primary Examiner* — Sean M Michalski

(74) *Attorney, Agent, or Firm* — Myers Wolin, LLC

(57) ABSTRACT

A radial press has at least six main jaws arranged concentrically and uniformly about a press axis to be moved radially in the direction of and away from the press axis by a drive unit. Each main jaw has a contact surface radially inwards and mechanical holding means for press jaws that can be attached in an exchangeable manner. A cutting tool is received in a tool installation area delimited outwardly by the main jaws. The cutting tool has multiple cutting attachments, each of which is attached to a main jaw and has a base structure. At least one of the cutting attachments has a cutting structure. Each base structure has a support surface which rests against the contact surface of the paired main jaw and at least one engagement element. The cutting structure protrudes from the paired base structure in the direction of the press axis.

14 Claims, 7 Drawing Sheets

(56) References Cited

U.S. PATENT DOCUMENTS

| | | | | | |
|---|---|---|---|---|---|
| 4,854,031 | A * | 8/1989 | Eisenzimmer | B30B 7/04 | 72/402 |
| 4,893,536 | A * | 1/1990 | Kinoshita | B21D 28/16 | 83/699.41 |
| 5,092,152 | A * | 3/1992 | Miller | H01R 43/0585 | 72/402 |
| 5,240,401 | A * | 8/1993 | Derckx | A23G 3/0289 | 425/126.2 |
| 5,715,723 | A * | 2/1998 | Owens | B21D 39/048 | 72/402 |
| 6,257,042 | B1 * | 7/2001 | Valimaki | H01R 43/058 | 72/402 |
| 6,519,998 | B2 * | 2/2003 | Ertl | B30B 7/04 | 72/402 |
| 7,152,452 | B2 * | 12/2006 | Kokish | A61F 2/958 | 72/402 |
| 8,230,714 | B2 * | 7/2012 | Intagliata | B21D 39/048 | 100/232 |
| 2013/0110074 | A1 * | 5/2013 | Smet | A61F 13/2088 | 100/232 |
| 2015/0273779 | A1 * | 10/2015 | Daub | B30B 15/28 | 100/264 |
| 2016/0038991 | A1 * | 2/2016 | Hofer | B21D 28/002 | 72/338 |
| 2017/0008062 | A1 * | 1/2017 | Honegger | B21D 28/16 | |

* cited by examiner

RADIAL PRESS

CROSS REFERENCE TO RELATED APPLICATIONS

This application is a continuation under 35 U.S.C. § 120 of International Application PCT/EP2023/059885, filed Apr. 17, 2023, which claims priority to German Application No. 20 2022 102 074.4, filed Apr. 19, 2022, the contents of each of which are incorporated by reference herein.

FIELD OF THE INVENTION

The present invention relates to a radial press with at least six base jaws, which are disposed uniformly and concentrically around a press axis, and which can be moved by means of a drive unit radially toward the press axis and away from it, wherein the base jaws are respectively provided on the radial inside with a contact face as well as with mechanical retaining means for press jaws that can be mounted exchangeably on them.

In particular, the present invention relates to a radial press of the type indicated in the foregoing, in which a cutting tool comprising a plurality of cutting attachments mounted respectively on a base jaw is received in the tool mounting space bounded on the outside by the base jaws, wherein the cutting attachments respectively comprise a base structure and at least one of them further comprises a cutting structure, wherein further the base structure respectively has a bracing face bearing on the contact face of the associated base jaw as well as at least one engaging element cooperating with the mechanical retaining means of the associated base jaw, and wherein beyond that the at least one cutting structure protrudes toward the press axis from the associated base structure and has a cutting edge facing away from the bracing face of the associated base structure.

BACKGROUND

Radial presses suitable for radially pressed articles of the most diverse type (e.g. the permanent mounting of connecting fittings to the end of a piece of hose for establishment of a hydraulic hose line) are known in various concepts (e.g. hollow-piston press, pressure-plate press and yoke press) and diverse configurations. Examples are disclosed in DE 20 2016 100 660 U1, DE 20 2016 008 097 U1, DE 10 2016 106 650 A1, DE 10 2014 014 585 B3, DE 10 2014 012 485 B3, DE 10 2014 008 613 A1, DE 10 2011 015 770 A1, DE 10 2011 015 654 A1, DE 10 2009 057 726 A1, DE 10 2005 041 487 A1, DE 10 2005 034 260 B3, DE 601 21 915 T2, DE 298 24 688 U1, DE 199 44 141 CI, DE 199 40 744 B4, DE 101 49 924 A1, DE 41 35 465 A1 and DE 35 13 129 A1. Regardless of their respective design type and other technical features, the known radial presses are alike in that a plurality of base jaws of approximately wedge-shaped base cross section—eight base jaws are most common—disposed in a manner distributed uniformly around the press axis are moved uniformly in radial direction relative to the press axis by means of a (typically hydraulic) drive. In this situation, press jaws that have a pressing face matched to the geometry (especially the diameter) of the respective workpieces to be pressed can be mounted on the radial inside of the base jaws.

Radial presses of the type under consideration here are associated with a considerable investment expense. This is the case in particular for modern, highly precise high-performance presses. The costs associated with purchasing them may represent a significant financial burden, especially for workshops and comparable, relatively small facilities, in which the radial presses under consideration here are used.

A radial press of the generic type has become known from EP 3 178 579 B1. Compared with conventional radial presses (see above), an increase of the economic efficiency is possible if, just as according to EP 3 178 579 B1, a radial press of the type under consideration here equipped—to some extent in conflict with the purpose—with a specific cutting tool adapted to the technical characteristics of the radial press can also be used to perform tasks aimed at cutting (to the extent of severing) workpieces. It is precisely workshops and comparable, relatively small facilities, in which radial presses are used, that may benefit in this way from very considerable efficiency-enhancing effects. The workload of the radial press can be increased to a relevant extent, since diverse demanding cutting tasks that can be accomplished with a radial press that is also modified for execution of cutting tasks are encountered in typical workshops. The increased economic efficiency in those situations also benefits from the circumstance that, ideally, there is no need to purchase a specific, explicit cutting mechanism or machine (or even several such machines). Thus the space requirement that would otherwise exist is also not needed and, without a specific, explicit cutting mechanism or machine, maintenance and service expenses otherwise associated with it are also obviated.

Compared with the prior art that can be learned from EP 3 178 579 B1, an object underlying the present invention is to increase the economic efficiency still further, especially by improvements with respect to the useful life of the relevant radial press.

SUMMARY

This object may be achieved, in that, in a generic radial press, the cutting tool has linear guide elements, which guide two base structures disposed diametrically opposite one another relative to one another with relative movability perpendicular to the press axis. By means of the linear guide elements implemented in the cutting tool itself, reactive forces or force components (transverse forces) occurring during cutting and acting between the two cutting edges with direction oriented transverse to the cutting direction are fed back within the cutting tool itself. Due to such a direct, closed internal flow of force within the cutting tool, transverse forces acting on the base jaws of the radial press are prevented. This is once again an effect of considerable importance for the useful life of the radial press. The linear guide elements that extend between the two base structures and couple them with one another in linearly guided manner may additionally achieve guidance if necessary of the workpiece or—after it has been severed—of the two workpiece parts.

Within the scope of the present invention, significant configuration latitude exists for constructing the cutting tool, i.e. especially the cutting attachments mounted on the base jaws of the radial press. Their constructive and structural configuration—as will become evident from the following explanations—can be optimized in terms of the respective cutting task while also taking into consideration the functional and structural characteristics of the respective radial press concept, wherein the flexible adaptation of the radial press to the respective cutting task with the least possible expense takes advantage of the circumstance that the radial press is already "innately" constructed, so to speak, in its basic version with a view to being equipped with different press jaws.

In a first preferred configuration of the invention, a cutting attachment facing the press axis and disposed opposite the cutting structure of another cutting attachment is provided with a backing structure having a workpiece contact face. In a specific version of this further development that is structurally particularly simple, the cutting tool inserted in the tool mounting space accordingly comprises precisely two cutting attachments, which are placed on two base jaws disposed diametrically opposite one another. One of those two cutting attachments has a cutting structure and the other, disposed opposite it, has a backing structure. During operation of this radial press, the cutting edge of the cutting structure severs the workpiece braced on the workpiece contact face of the backing structure, wherein the workpiece contact face of the backing structure is typically adapted in terms of its geometry to the geometry of the cutting edge and if necessary also to the workpiece. This backing structure may protrude from the associated base structure toward the press axis. In extreme cases, however, the backing structure may be part of the base structure itself, in that the workpiece contact face is formed by that surface of the base structure of the relevant cutting attachment which faces the press axis.

Another preferred further development of the invention is characterized in that at least two cutting attachments—respectively protruding toward the press axis from the associated base structure—have cutting structures with cutting edges that interact with one another in cutting relationship. Shearing in particular can be considered as such a cutting interaction that brings about severing of the respective workpiece. For this purpose, in a corresponding particularly preferred configuration of this further development, the cutting edges of two cutting attachments are disposed relative to one another—in a direction transverse to the direction of movement of the cutting attachments relative to one another—in parallel offset relationship; if the cutting edges were oriented perpendicular to the press axis, they would therefore be offset parallel to one another in the direction of the press axis. In the course of the closing movement of the radial press, a shearing action would be exerted on the workpiece as a consequence of the said parallel offset of the cutting edges.

For diverse cutting tasks to be performed with precisely the radial press modified according to embodiments of the invention, however, crimping is preferred over shearing as a cutting interaction by means of which the respective workpiece is severed. For this purpose, in a particularly preferred alternative configuration, the cutting structures have cutting edges that correspond to one another and are disposed opposite one another in relative direction of movement of the cutting attachments relative to one another, i.e. in the plane of movement. The cutting edges of the cutting structures of two cutting attachments correspond to one another in this sense when, at the end of the radial movement of the base jaws (idealized) oriented toward the press axis, they come together along a line of contact or become opposite one another along their extent with a minimum spacing (such as 0.2 mm), which depends, for example, on the material of the workpiece to be severed.

In this preferred implementation of the cutting attachments with cutting edges constructed to correspond to one another in such a way that they come together in idealized linear manner when the cutting tool is completely closed, the relevant idealized line of contact may—due to straight construction of the two cutting edges—be straight. However, this is in no way imperative. Depending on the intended use, as will be explained in more detail further on, cutting-edge geometries deviating from a straight line in one or two dimensions may also be considered. Incidentally, this is also true for the two cutting edges—offset from one another and exerting shearing action on the workpiece—of a corresponding cutting tool (see above) for generating a non-planar cut. Due to the construction of the cutting edges of the cutting attachments in such a way that they correspond to one another and become opposite one another in relative direction of movement of the cutting attachments, it is possible—in contrast to the case of cutting edges that are offset from one another and exert a shearing action on the workpiece—to prevent reactive forces offset asymmetrically relative to one another, i.e. especially in the direction of the press axis, from acting on the base jaws carrying the cutting attachments. This may be of considerable practical importance, because various typical radial presses of conventional design type react to such asymmetric load profiles with increased wear and thus shortened useful like. This would be counterproductive in relation to the present object, which is aimed at increased economic efficiency.

A further advantage of this configuration having great practical relevance is that, for severing the workpiece, not only two cutting structures may be used, as in shearing, but especially also three cutting structures, as in a radial press equipped with six base jaws for example, or four cutting structures, as in a radial press equipped with eight base jaws for example. In such cases the cutting edges may preferably be respectively angled, with a pronounced pointed tip. By way of example, this would actually have an angle of 120° in the case of three cutting structures and an angle of 90° in the case of four cutting structures. In these configurations characterized by the existence of more than two cutting structures, not only is it a positive consequence that ejection of the workpiece during severing is prevented and that penetration of the cutting edges—forming a pointed tip—into the workpiece is facilitated, but also it is advantageous that the transmission of force is more uniform and the flow of force in the radial press is more favorable, especially in radial presses of hollow-piston or pressure-plate design style.

To prevent misconceptions, it must be pointed out once again as a precaution that the cutting edges explained in the foregoing and disposed opposite one another in a cutting plane are in no way absolutely required to be in contact with one another at the end of the cutting movement, certainly not over the entire length. To the contrary, such configurations are advantageous for various cutting tasks, such as severing of various workpieces, in which the cutting edges maintain a distance from one another or define between one another an open space—if necessary over part of their length—that has a shape (such as round, oval or polygonal) appropriate for the respective workpiece. Furthermore, it must be pointed out that the base jaws equipped with cutting attachments are in no way absolutely required to move synchronously; although this is actually appropriate for most applications of embodiments of the invention, individual cases are also entirely possible in which a radial movement of the base jaws relative to one another takes place in a presettable sequence in time relative to one another (and if necessary overlapping one another), provided the configuration of the drive unit is suitable (e.g. by means of independently controlled individual drives).

According to another preferred further development of the invention, the contact faces of the base jaws as well as the bracing faces of the base structures of the cutting attachments are cylindrically curved in a manner corresponding to one another. This may favor self-adjusting or self-securing mounting of the cutting attachments on the associated base jaws in the sense that lateral forces generated during the cutting process may be diverted better into the base jaws, possibly contributing to lightening of the load on the pair comprising retaining means and engaging elements used for securing the cutting attachments in position. In addition, this configuration contributes to a favorable flow of force while reducing harmful stress peaks. Particularly preferably, the base structures of the cutting attachments project over the associated base jaws in circumferential direction. Such projections form (at least partly) covers for the gaps present between the relevant base jaws and the two neighboring base jaws. Thus the danger is reduced that workpiece splinters or other fragments formed during the cutting process will travel into the relevant gaps.

The effect considered in detail in the foregoing is particularly noticeable when, according to yet another preferred configuration of the invention, the two cutting attachments are mounted on base jaws disposed vertically one above the other. Handling during use of the radial press modified according to embodiments of the invention also benefits from such an arrangement of the cutting attachments, since the workpiece to be cut may be deposited if necessary on the cutting edge of the lower cutting attachment, thus reducing the load on the user and permitting particularly precise executing of cuts.

In connection with the arrangement of the cutting attachments disposed vertically one above the other in the manner explained in the foregoing, and furthermore also because of the inherent statics of the relevant machine concept and of the flow of force specifically characteristic to it, the present invention is preferably implemented in radial presses constructed as so-called yoke presses, i.e. in such radial presses that have a lower yoke and an upper yoke, the vertical spacing between which can be varied by means of at least one drive element (e.g. designed as a hydraulic cylinder). In this case, particularly high cutting forces can be achieved by implementation of the present invention. This is true in particular when the cutting attachments are placed on those two base jaws which are disposed in fixed position relative to the lower yoke or to the upper yoke.

According to yet another preferred further development of the invention, the cutting tool comprises two wall elements that extend substantially parallel to the press axis and laterally bound the (temporary) space between the two base structures when the cutting tool is closed. Thus—at least over a partial range of cutting movement of the two cutting attachments relative to one another—the region in which the workpiece to be cut will be severed is closed off at the sides. This likewise contributes—see above—to reducing the danger that workpiece splinters or other fragments formed during the cutting process will travel into the gaps present between the relevant base jaw and the two neighboring base jaws. In the case of a vertical cutting direction, the said wall elements are mounted particularly preferably on the base structure of the lower cutting attachment or form a part thereof.

Regardless of their detailed geometry (straight or else deviating therefrom in one or two dimensions; see above), the two cutting edges are particularly preferably oriented at least substantially transverse to the press axis for diverse typical applications of the present invention. Hereby, loads leading to asymmetric stress profiles—which are potentially detrimental to the useful life of the radial press—are prevented as much as possible. In addition, this configuration of the cutting tool makes it possible to sever workpieces (such as hoses, bars, tubes, rods, chain links, etc.) inserted therein with orientation parallel to the press axis in a way that achieves the smallest area of cut and thus optimized force. For an optimum result during other applications (e.g. blasting of tubes, sleeves, nuts, etc.), however, it proves favorable when the two cutting edges—again regardless of their detailed geometry (straight or else deviating therefrom in one or two dimensions; see above)—are oriented at least substantially parallel to the press axis. For yet other applications, cutting edges oriented obliquely relative to the press axis prove to be favorable. Against this background, a particularly preferred configuration of the invention is characterized in that the cutting structures are mounted—with respect to the orientation of the respective cutting edge—adjustably on the associated base structure.

For handling of the radial press modified according to embodiments of the invention, namely the execution of cutting tasks with good reproducibility, it is of particular advantage when the cutting tool, according to yet another further development of the invention, has at least one workpiece holder provided in the region of a front side of a base structure. Such a workpiece holder may be mounted, especially exchangeably, on the associated base structure, which with little expense—promoting reproducibility—permits specific adaptation of the cutting tool to the most diverse cutting tasks and workpieces. According to a particularly preferred configuration, the workpiece holder (if necessary mounted exchangeably on the associated base structure) has the form of a mandrel; this proves to be very advantageous, for example, for severing of chains, when a link of the chain to be severed is suspended on the mandrel. If the mandrel is spaced so far apart from the two cutting edges that the chain link to be severed is itself not suspended but instead a link spaced away from it is, the mandrel contributes after cutting to retaining the relevant portion of the severed chain and preventing it from dropping downward. This is also advantageous from the viewpoint of industrial safety.

A largely comparably positive result—according to an alternative preferred embodiment—can be achieved when the workpiece holder (if necessary mounted exchangeably on the associated base structure) has the form of a metal sheet provided with a cutout, wherein the cutout is dimensioned such that the chain link next to the chain link to be severed is introduced therein.

According to yet another very advantageous further development of the invention, centering and/or retaining attachments are mounted on at least two further base jaws of the radial press and have workpiece holders offset axially relative to the cutting structures of the cutting tool. Particularly preferably, these centering and/or retaining attachments are sufficiently flexible that workpiece contact faces of the workpiece holders are able to shorten their spacing from the associated base jaws against a preload. During closing of the radial press, i.e. when the base jaws move radially (and preferably synchronously) toward the press axis, the workpiece holders of the centering and/or retaining attachments on the workpiece to be severed come into contact before or shortly after the blades of the cutting tool are placed on the workpiece; in this way they retain the workpiece in position during the (further) severing process and prevent it from being ejected or slipping, thus contributing to neat execution of the cut. A further very advantageous effect of the centering and/or retaining attachments may exist in that, even after cutting has taken place, they still retain the relevant portion (s) of the workpiece that is to be severed or has been severed and prevent it or them from dropping downward and/or from being catapulted out of the cutting tool. This is again very advantageous from the viewpoint of industrial safety.

BRIEF DESCRIPTION OF THE DRAWING

Several preferred exemplary embodiments of the present invention will be explained in more detail hereinafter on the basis of the drawing, wherein.

DETAILED DESCRIPTION OF THE PREFERRED EMBODIMENTS

Figure 1:
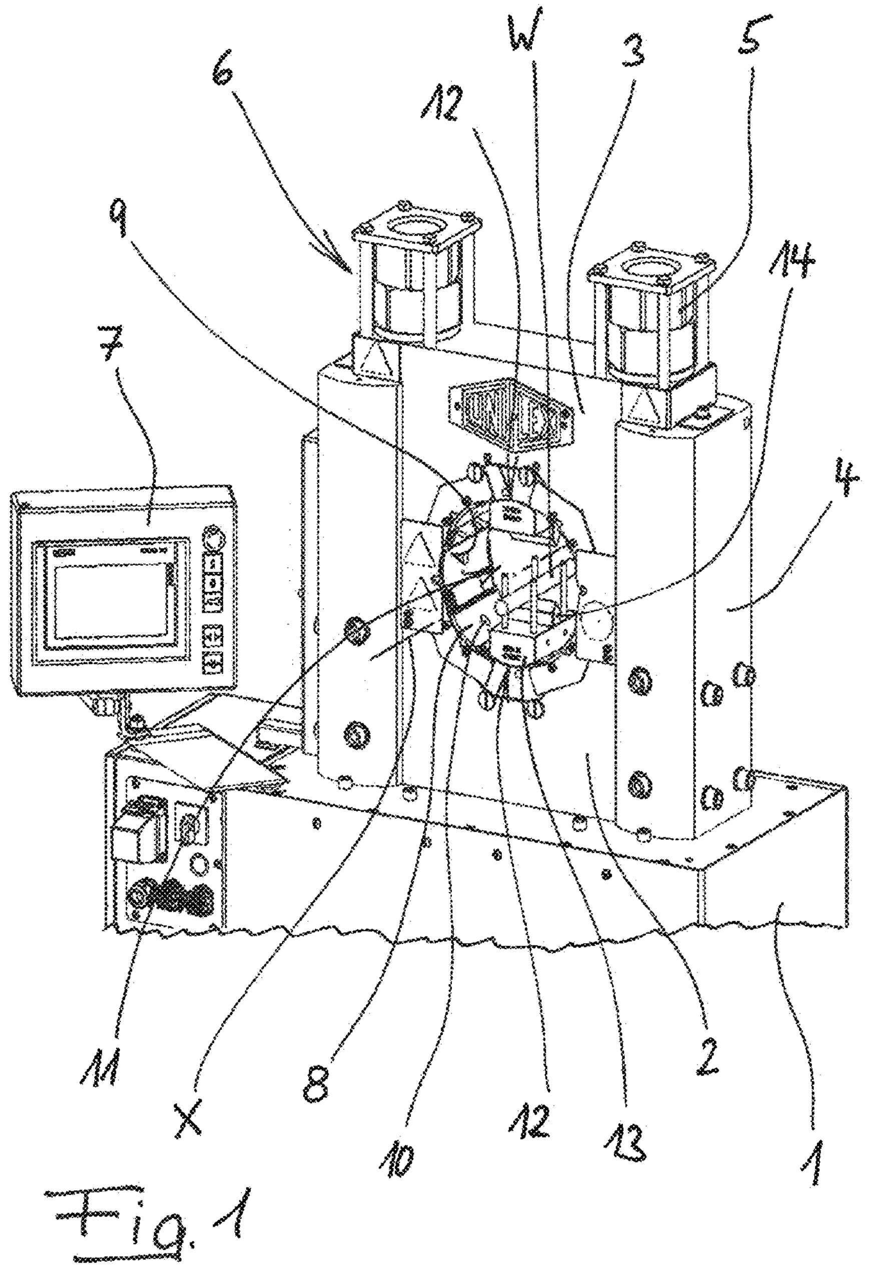
FIG. 1 shows a perspective view from the front/operator's side of the region relevant here according to a first exemplary embodiment of a radial press modified according to the invention.

The radial press underlying the various exemplary embodiments of the invention presented in the drawing and constructed conceptionally as a kind of yoke press corresponds to the pertinent prior art with which the authoritative person skilled in the art is familiar. In this context, the invention is specifically illustrated on the basis of the HM 325 radial press of Uniflex-Hydraulik GmbH, 61184 Karben (Germany).

The radial press in question comprises a base 1, a lower yoke 2 that is stationary relative to it and an upper yoke 3, which can be moved vertically up and down relative to lower yoke 2. For this purpose, upper yoke 3 is guided displaceably in two guides 4 projecting from base 1. Also shown are upper end portions 5 of two hydraulic drive cylinders 6, which in known manner are part of the drive unit that brings about the relative movement of upper yoke 3 and lower yoke 2 relative to one another. And operator control unit 7, which among other purposes functions to set up the radial press by calling up a press program that runs in the machine control system and to adapt it for specific procedures, is also shown.

The radial press is equipped in known manner with base jaws 8, which are disposed uniformly and concentrically around a press axis X and which, by virtue of the relative movement of upper yoke 3 and lower yoke 2 relative to one another, can be moved synchronously in radial direction toward press axis X while upper yoke 3 is being lowered and in radial direction away from press axis X while upper yoke 3 is being raised. Base jaws 8 are respectively provided on the radial inside with a cylindrically curved contact face 9 for press jaws that can be mounted exchangeably on them. Furthermore, base jaws 8 comprise—in their interior—mechanical retaining means in the form respectively of a spring-loaded retaining pin which, when a press jaw is placed on the relevant base jaw 8, engages interlockingly in a corresponding groove of a retaining peg provided on the radial outside of the relevant press jaw and inserted into bore 10 of base jaw 8. Since the radial press used in the exemplary embodiments corresponds in the foregoing scope to the sufficiently known prior art, to which reference is made, more extensive explanations are unnecessary.

Figure 2:
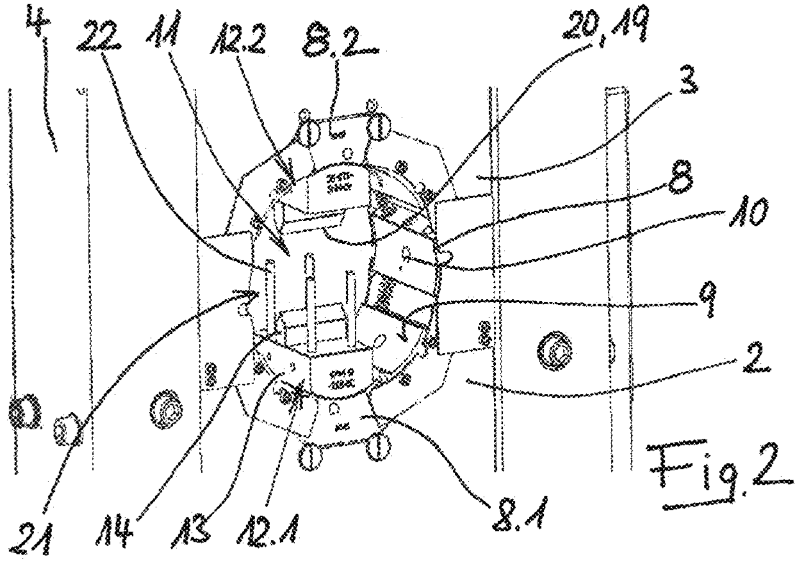
FIG. 2 shows an enlarged view of the cutting tool, received in the tool mounting space and comprising two cutting attachments, of the radial press according to FIG. 1 in open position.
Figure 3:
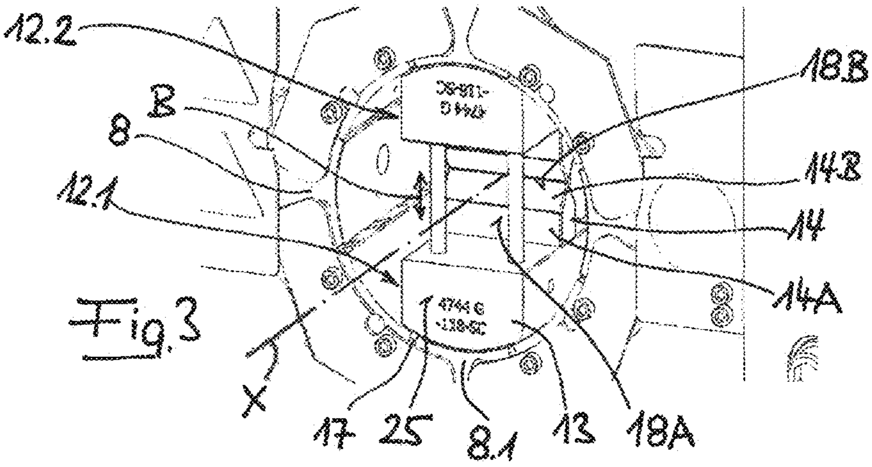
FIG. 3 shows the cutting tool, received in the tool mounting space, of the radial press according to FIGS. 1 and 2 in closed position.

According to FIGS. 1 to 3, which illustrate a first exemplary embodiment of the invention, the radial press is equipped with a cutting tool 11. This is received in the tool mounting space, which is bounded on the outside by base jaws 8. It comprises two cutting attachments 12 mounted on base jaws 8 disposed opposite one another, namely a first cutting attachment 12.1 mounted on lower base jaw 8.1 ("6 o'clock base jaw"), which is fixed in position relative to lower yoke 2, and second cutting attachment 12.2, which is mounted on upper base jaw 8.2 ("12 o'clock base jaw"), which is fixed in position relative to upper yoke 3.

Each of the two cutting attachments 12.1, 12.2 comprises a base structure 13 and a cutting structure 14. This base structure 13 is provided respectively with a cylindrically curved bracing face 15 (see FIG. 4), which bears on contact face 9 of the associated base jaw 8 and corresponds to it; by analogy with the press jaws intended for use in the radial press, it further comprises an engaging element, which cooperates with the mechanical retaining means of the associated base jaw 8 and has the form of a retaining peg 16 (see FIG. 4) introduced into bore 10 of the associated base jaw 8. Base structures 13 of cutting attachments 12 project in circumferential direction over the respectively associated base jaw 8 (see FIGS. 2 and 3); thus, when the radial press is closed (and thus when cutting tool 11 is closed), they cover the gaps 17 (see FIG. 3) present between the relevant base jaws 8 that carry cutting attachment 12 and the two neighboring base jaws.

Cutting structure 14 protrudes respectively toward press axis X from base structure 13 of the relevant cutting attachment 12. This is constructed in the form of a prism with a base region 14A (having wall portions 18A oriented parallel to one another) and a cutting region 14B (having wall portions 18B intersecting one another at an acute angle). The cutting edge 19 of the last-mentioned wall portion 18B then defines a blade—like cutting edge 20. Cutting edges 20 of the two cutting attachments 12 are then disposed opposite one another in relative direction of movement B of cutting attachments 12, i.e. in the plane of movement of cutting structures 14. They correspond to one another, in that they are in contact with one another (in idealized manner) along a line of contact when the radial press is closed (FIG. 3). By virtue of the corresponding alignment of cutting structures 14, cutting edges 20 are then (also) oriented transverse to press axis X.

Cutting structures 14 consist of hardened steel. They are mounted—via conventional dowel pin connections—on the respectively associated base structure 13. This makes it possible to post-machine cutting structures 14 when they are removed from base structures 13 or to replace them in case of wear and tear. In addition, given suitable construction of base structures 13, this permits adjustable mounting of cutting structures 14 thereon in different angular arrangements, e.g. such as angles of 30°, 45° and/or 60 relative to press axis X or parallel to it.

In the exemplary embodiment according to FIGS. 1 to 3, cutting tool 11 further has linear guide elements 21, which guide the two base structures 13 to one another with relative movability perpendicular to press axis X, i.e. in direction of movement B. These linear guide elements 21 are constructed in the form of four guide bolts 22, which are joined firmly with base structure 13 of lower, first cutting attachment 12.1 and during closing of the radial press are inserted into associated guide bores 23 constructed on base structure 13 of upper, second cutting attachment 12.2 (see FIG. 11).

Figure 3A:
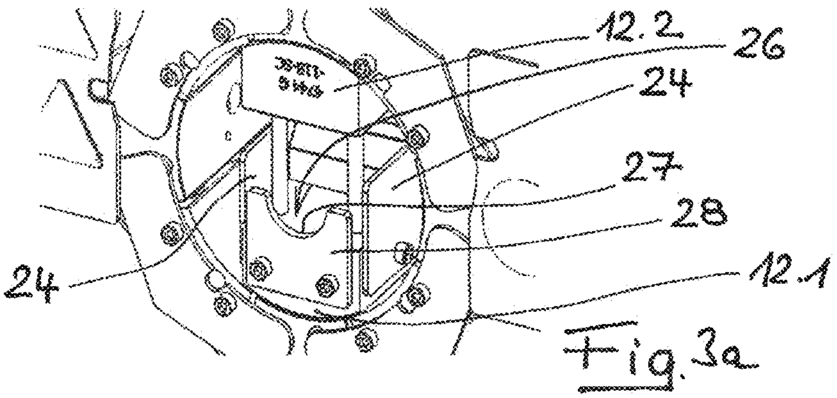
FIG. 3*a* shows a modification of the cutting tool according to the first exemplary embodiment.

In the modification, illustrated in FIG. 3*a*, of cutting tool 11 according to the first exemplary embodiment, cutting tool 11 additionally comprises two wall elements 24, which are mounted laterally on base structure 13 of lower, first cutting attachment 12.1 and extend substantially parallel to press axis X and which laterally bound the temporary space between the two base structures 13 when cutting tool 11 is closed. Furthermore, cutting tool 11 according to FIG. 3*a* has a workpiece holder 26, which is provided exchangeably on base structure 13 of first cutting attachment 12.1 in the region of front side 25 facing the operator, and which has the form of a metal sheet 28 having a cutout 27 for workpiece W (see FIG. 1).

Figure 4:
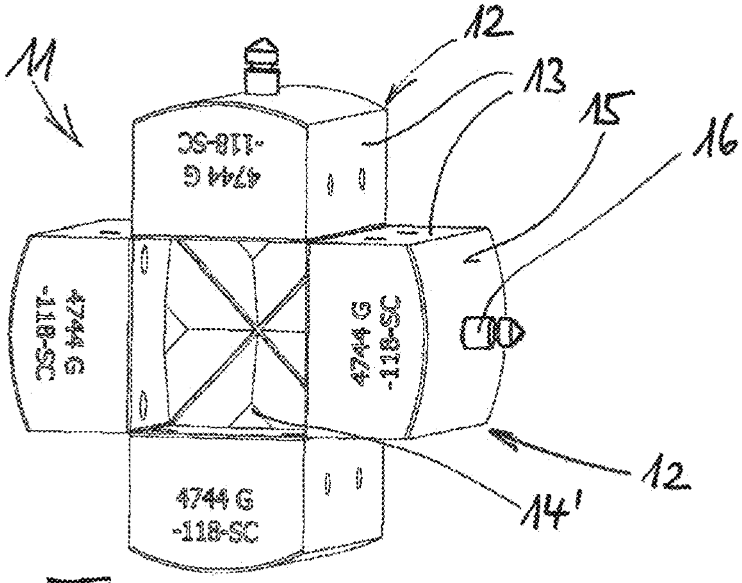
FIG. 4 shows a perspective view of the cutting tool, to be received in the tool mounting space of the radial press and comprising four cutting attachments, according to a second exemplary embodiment of the invention in closed position.
Figure 5:
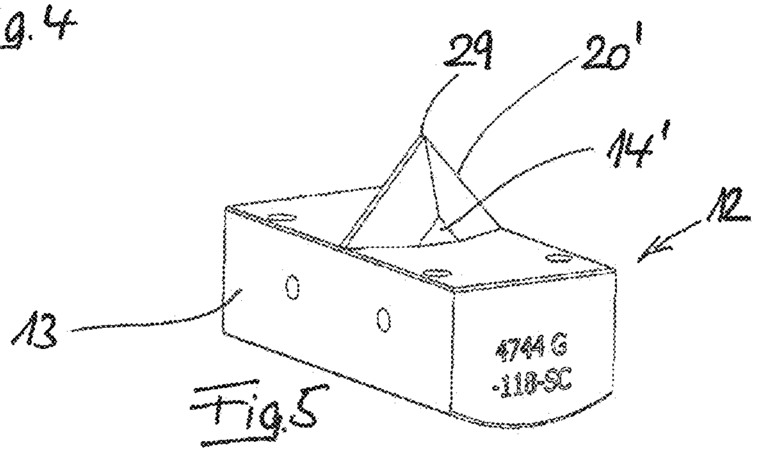
FIG. 5 shows a perspective view of one of the four cutting attachments of the cutting tool according to FIG. 4.
Figure 6:
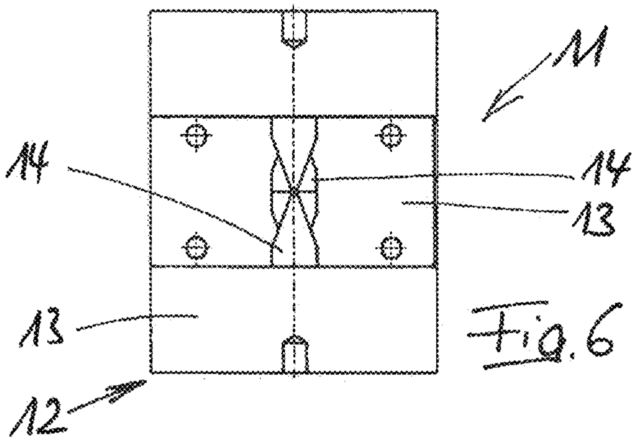
FIG. 6 shows an axial section through the cutting tool according to FIG. 4.

According to the second exemplary embodiment illustrated—only within the scope of cutting tool 11—in FIGS. 4 to 6, cutting tool 11, with which the radial press according to the first exemplary embodiment is to be equipped instead of with the cutting tool shown in FIGS. 1 to 3, is provided not with two but instead with four cutting attachments 12. Base structures 13 here correspond substantially to those of the first exemplary embodiment. In contrast, the configuration of cutting structures 14' is basically different. In particular, they are each constructed with an angled cutting edge 20', wherein the two portions of each cutting edge 20' come together at a 90° angle to form a pointed tip 29. In addition, FIG. 6 makes it obvious that the cutting angle—of approximately 45°—is substantially smaller here than the cutting angle of cutting tool 11 according to the first exemplary embodiment.

For application of this cutting tool 11, one consideration is mounting of the four cutting attachments 12 on the base jaws 8 in 12 o'clock, 3 o'clock, 6 o'clock and 9 o'clock positions, as is also mounting turned by 45° relative to press axis X.

Figure 7:
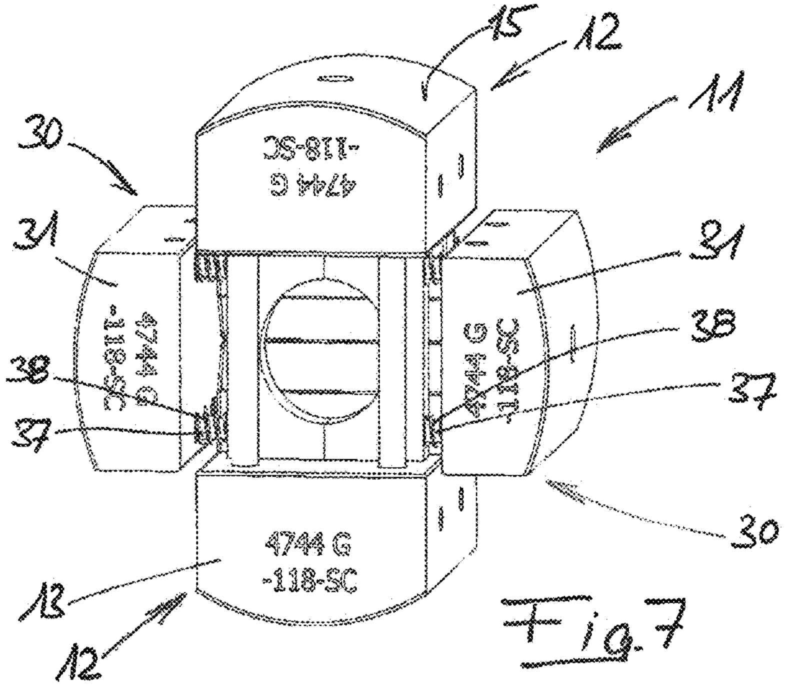
FIG. 7 shows a perspective view of the cutting tool, to be received in the tool mounting space of the radial press and comprising two cutting attachments as well as two centering and retaining attachments, according to a third exemplary embodiment of the invention in closed position.
Figure 8:
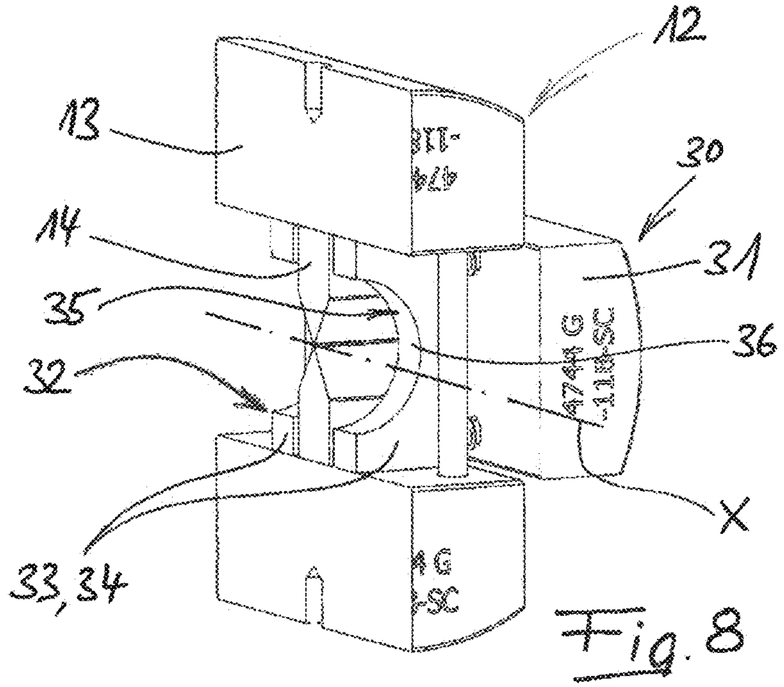
FIG. 8 shows a half section through the cutting tool according to FIG. 7.

The third exemplary embodiment illustrated—again only within the scope of cutting tool 11—in FIGS. 7 and 8 can be understood—as far as the two cutting attachments 12 are concerned—from the explanations about the first exemplary embodiment of the invention shown in FIGS. 1 to 3. In contrast to this, the third exemplary embodiment is characterized by the two additional centering and retaining attachments 30, which—turned by 90° relative to press axis X—are disposed between the two cutting attachments 12. Each centering and retaining attachment 30 comprises a base structure 31 and a centering and retaining structure 32. For base structure 31—especially with respect to mounting on a base jaw 8 of the radial press to be fitted with cutting tool 11—the foregoing explanations concerning base structure 13 of cutting attachment 12 are correspondingly applicable. The respective centering and retaining structure 32 comprises two workpiece holders 33 in the form of retaining jaws 34 having a cutout 35 (workpiece contact face 36) adapted to the geometry of workpiece W to be severed. These retaining jaws 34 are axially offset relative to cutting structures 14 of the two cutting attachments 12 in such a way that cutting structures 14 are disposed between retaining jaws 34. Retaining jaws 34 are mounted in resiliently flexible manner on associated base structure 31 in such a way that workpiece contact faces 36 of workpiece holders 33 are able to shorten their spacing from the associated base jaws 8 against a preload. Combinations of guide bolts 37 and preload springs 38 are used for this purpose. This ensures that the four workpiece holders 33 encircle workpiece W to be severed at a sufficiently early stage, ideally as soon as or shortly after the cutting process begins.

Figure 9:
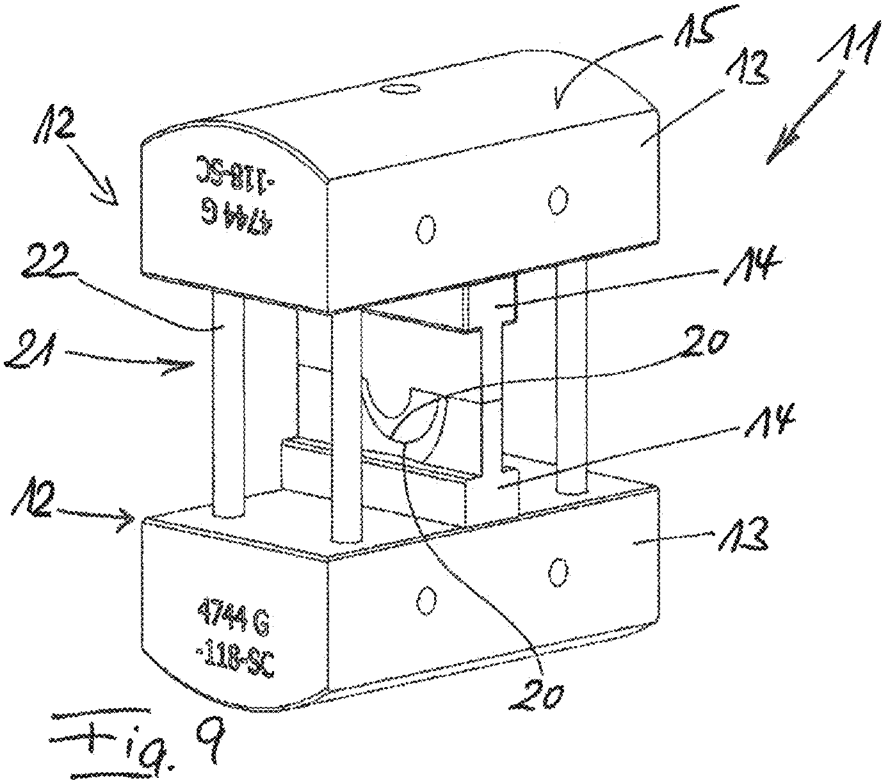
FIG. 9 shows a perspective view of the cutting tool, to be received in the tool mounting space of the radial press, according to a fourth exemplary embodiment of the invention in closed position.
Figure 10:
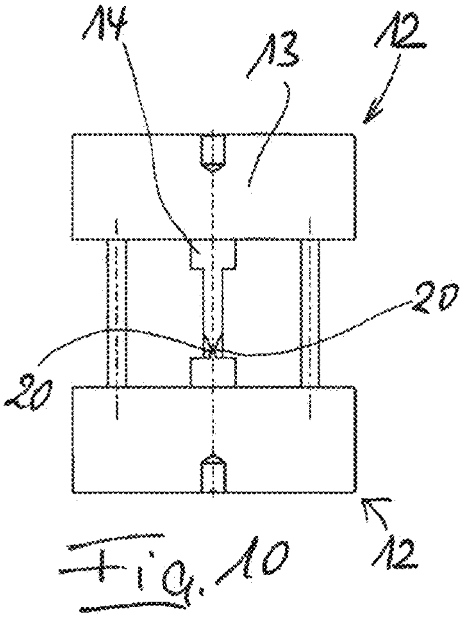
FIG. 10 shows an axial section through the cutting tool according to FIG. 9.
Figure 11:
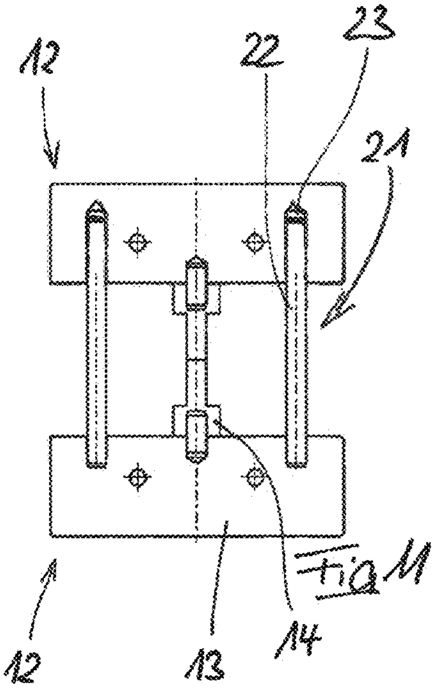
FIG. 11 shows a vertical section, offset parallel to the axial section according to FIG. 10, through the cutting tool according to FIGS. 9 and 10.

The fourth exemplary embodiment illustrated—again only within the scope of cutting tool 11—in FIGS. 9 to 11 can be understood—as far as the two cutting attachments 12 are concerned—from the explanations about the first exemplary embodiment of the invention shown in FIGS. 1 to 3. In contrast to this, the fourth exemplary embodiment is characterized in that the two cutting edges 20 corresponding to one another extend not as a straight line but instead according to a portion of a circular arc. In addition, they are limited to part of the width of cutting structures 14, namely its middle region.

Figure 12:
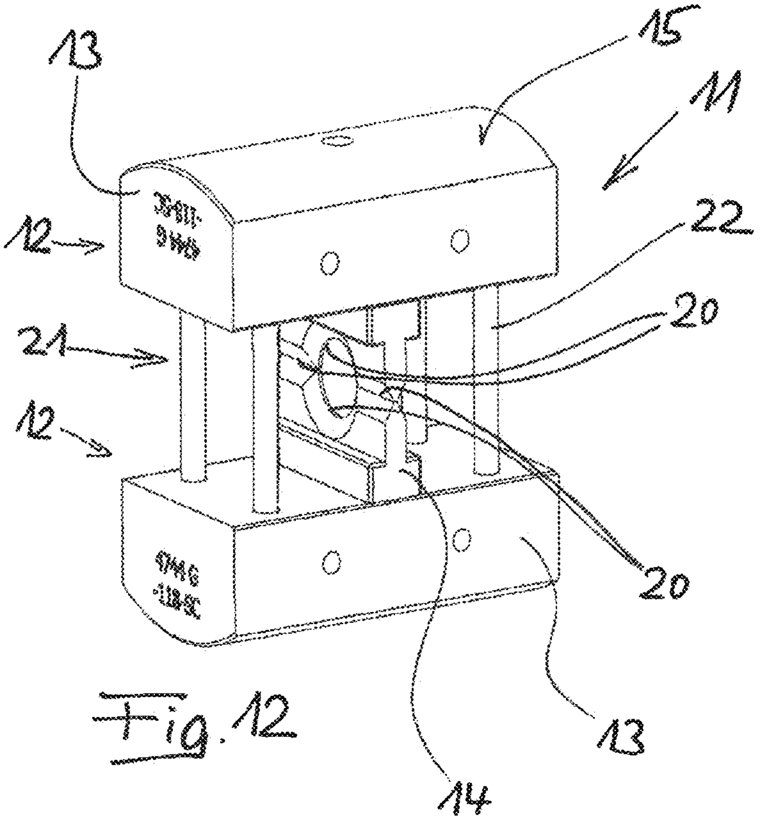
FIG. 12 shows a perspective view of the cutting tool, to be received in the tool mounting space of the radial press, according to a fifth exemplary embodiment of the invention in closed position.

The fifth exemplary embodiment illustrated—again only within the scope of cutting tool 11—in FIG. 12 can be understood largely from the explanations about the first exemplary embodiment of the invention shown in FIGS. 1 to 3. In contrast to this, the fifth exemplary embodiment is characterized in that the two cutting edges 20 correspond to one another only in certain regions, namely in two outer portions, in the sense that they bear on one another in (idealized) linear relationship when cutting tool 11 is closed. In a central portion, on the other hand, cutting edges 20 do not correspond to one another but instead define a cutting opening 39 (illustrated by way of example here as a circular contour). Obviously the geometry of cutting opening 39 can be adapted to the geometry of workpiece W to be severed.

Figure 13:
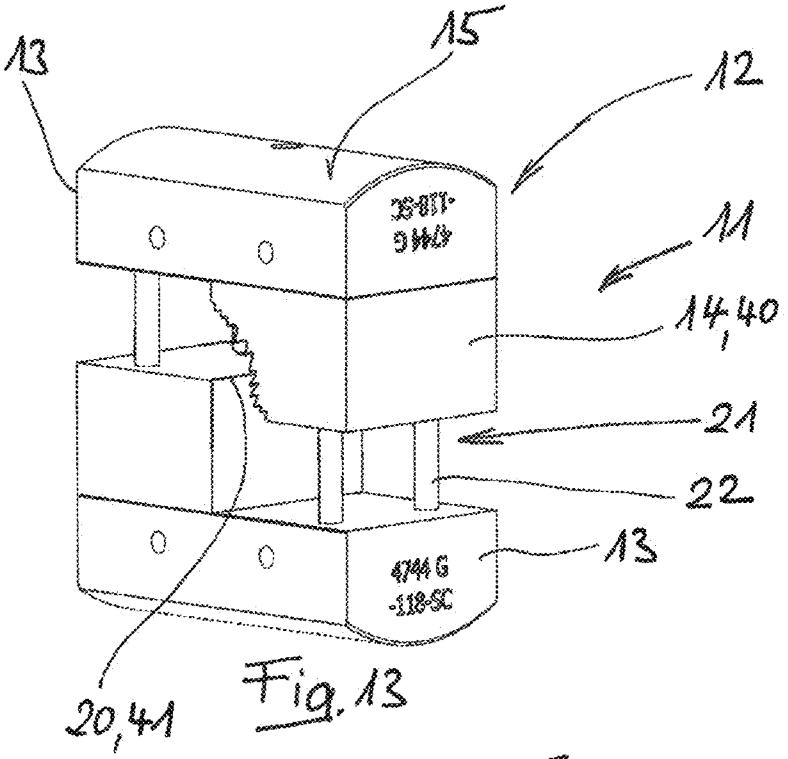
FIG. 13 shows a perspective view of the cutting tool, to be received in the tool mounting space of the radial press, according to a sixth exemplary embodiment of the invention in closed position
Figure 14:
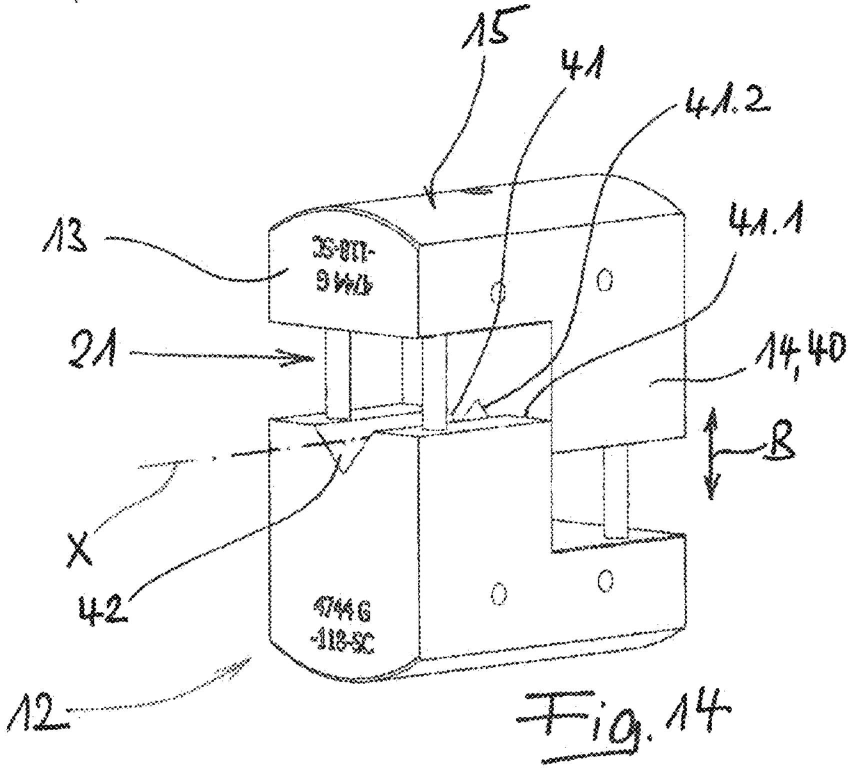
FIG. 14 shows a perspective view of the cutting tool, to be received in the tool mounting space of the radial press, according to a seventh exemplary embodiment of the invention in partly closed position.

Unlike the cutting tools according to the five exemplary embodiments explained in the foregoing, those according to FIGS. 13 and 14 are intended not for severing a workpiece by crimping, but instead for severing a workpiece by shearing.

In the sixth exemplary embodiment of the invention illustrated—again only within the scope of the cutting tool—in FIG. 13, cutting tool 11 consists of two cutting attachments 12 as well as four linear guide elements 21. Each of these two cutting attachments 12 comprises for its part a base structure 13 as well as a cutting structure 14 protruding therefrom toward the press axis. The above explanations, to which reference is made to avoid repetitions, apply without restriction to the respective base structure 13 as well as the four linear guide elements 21. In contrast, the two cutting structures 14 are constructed here as shearing blocks 40 offset from one another in the direction of press axis X. Each of the shearing blocks 40 defines a cutting edge 20 in the form of a shearing edge 41. These are explained in precisely that sixth exemplary embodiment.

In contrast, in the seventh exemplary embodiment of the invention illustrated in FIG. 14, shearing edges 41—forming cutting edges 20—of shearing blocks 40 are not straight. Instead, they extend—in a shearing plane disposed perpendicular to press axis X—respectively in multiple-angled manner and, in fact, in such a way that two outer portions 41.1 lie on a straight line orthogonal to direction of movement B, while the inner portions 41.2 lying between them are oriented in V-shaped relationship with one another. The V-shaped arrangement of these inner shearing-edge portions 41.2 corresponds to a workpiece-receiving slot 42, which has a V-shaped cross section, on that face of the relevant shearing block 40 which faces base structure 13 of the respective other cutting attachment 12.

It is further evident in FIG. 14 that, within the scope of the present invention, base structure 13 and cutting structure 14 also comprise two functional regions of a single structural part, i.e. the relevant cutting attachment 12 can be constructed in one piece. As is stated expressly by way of precaution to prevent misconceptions, it is obvious that this also applies correspondingly for the other exemplary embodiments of the invention explained in the foregoing.

What is claimed is:

1. A radial press with at least six base jaws (8), which are disposed uniformly and concentrically around a press axis (X), and which can be moved by means of a drive unit radially toward the press axis (X) and away from it, wherein the base jaws (8) are respectively provided on the radial inside with a contact face (9) as well as with mechanical retaining means for press jaws that can be mounted exchangeably on them, wherein a cutting tool (11) having the features described below is received in the tool mounting space bounded on the outside by the base jaws (8):

the cutting tool (11) comprises a plurality of cutting attachments (12) mounted respectively on a base jaw (8);

the cutting attachments (12) respectively comprise a base structure (13) and at least one of them further comprises a cutting structure (14);

the base structure (13) respectively has a bracing face (15) bearing on the contact face (9) of the associated base jaw (8) as well as at least one engaging element cooperating with the mechanical retaining means of the associated base jaw (8);

the at least one cutting structure (14) protrudes toward the press axis (X) from the associated base structure (13) and has a cutting edge (20) facing away from the bracing face (15) of the associated base structure (13);

wherein the cutting tool (11) has linear guide elements (21), which guide two base structures (13) disposed diametrically opposite one another relative to one another with relative movability (B) perpendicular to the press axis (X).

2. The radial press of claim 1, wherein a cutting attachment (12) facing the press axis (X) and disposed opposite the cutting edge (20) of the cutting structure (14) of another cutting attachment (12) is provided with a backing structure having a workpiece contact face.

3. The radial press of claim 1, wherein at least two cutting attachments (12) have cutting structures (14) with cutting edges (20) that interact with one another in cutting relationship.

4. The radial press of claim 3, wherein, for a shearing action on the workpiece (W), the cutting edges (20) are disposed relative to one another, in a direction transverse to the direction of movement (B) of the cutting attachments (12) relative to one another, in parallel offset relationship.

5. The radial press of claim 3, wherein the cutting structures (14) have cutting edges (20) that correspond to one another and are disposed opposite one another in relative direction of movement (B) of the cutting attachments (12) relative to one another.

6. The radial press of claim 1, wherein it comprises two cutting attachments (12) mounted on base jaws (8) disposed opposite one another, preferably vertically one above the other.

7. The radial press of claim 6, wherein it is constructed as a yoke press with a lower yoke (2) and an upper yoke (3), wherein the spacing of the yokes (2; 3) relative to one another can be varied by means of the drive unit.

8. The radial press of claim 3, wherein every second base jaw (8) is equipped with a cutting attachment (12).

9. The radial press of claim 1, wherein the contact faces (9) of the base jaws (8) as well as the bracing faces (15) of the base structures (13) of the cutting attachments (12) are cylindrically curved in a manner corresponding to one another.

10. The radial press of claim 1, wherein the base structures (13) of the cutting attachments (12) project in circumferential direction over the associated base jaws (8).

11. The radial press of claim 1, wherein the at least one cutting edge (20) is oriented transverse to the press axis (X).

12. The radial press of claim 1, wherein the at least one cutting edge (20) is oriented obliquely or parallel to the press axis (X).

13. The radial press of claim 1, wherein the at least one cutting structure (14) is mounted, with respect to the orientation of its cutting edge (20), adjustably on the associated base structure (13).

14. The radial press of claim 1, wherein the cutting tool (11) comprises two cutting attachments (12) disposed diametrically opposite one another and two wall elements (24) that extend substantially parallel to the press axis (X) and laterally bound the temporary space between the two base structures (13) when the cutting tool (11) is closed.

* * * * *